United States Patent [19]

Tuttle

[11] 3,896,252

[45] July 22, 1975

[54] PROCESS OF METAL PLATING ON PLASTICS

[75] Inventor: Carole K. Tuttle, Midland, Mich.

[73] Assignee: The Dow Chemical Company, Midland, Mich.

[22] Filed: Feb. 4, 1974

[21] Appl. No.: 439,453

[52] U.S. Cl.................................. 427/306; 427/400
[51] Int. Cl......................... C23c 3/02; B44d 1/092
[58] Field of Search........ 260/880 B; 117/47 A, 118

[56] References Cited
UNITED STATES PATENTS

| | | | |
|---|---|---|---|
| 3,222,218 | 12/1965 | Beltzer et al.................. | 117/47 A X |
| 3,359,345 | 12/1967 | Doak et al....................... | 260/880 B |
| 3,567,488 | 3/1971 | Rathsack ......................... | 117/47 A |
| 3,649,713 | 3/1972 | Chin et al. ....................... | 260/876 R |
| 3,702,285 | 11/1972 | Knorre et al.................. | 117/47 A X |

*Primary Examiner*—Ralph S. Kendall
*Assistant Examiner*—John D. Smith
*Attorney, Agent, or Firm*—H. L. Aamoth

[57] ABSTRACT

The thermoplastic polymer employed in this invention is a rubber modified unsaturated carboxylic acid or anhydride containing polymer which is prepared by polymerizing the monomers in the presence of the rubber in a finely divided form. The surface to be metallized is first aminated with a solution of ethylenediamine or 1,3-diaminopropane in an inert solvent of about 50 to 100 volume percent of a water miscible organic solvent and 0 to about 50 percent water, then treated with a noble metal salt solution and thereafter with a reducing agent to produce a metallized surface having a resistance of 100 ohms/sq. or less. The metallized surface can then be further plated by conventional means.

21 Claims, No Drawings

PROCESS OF METAL PLATING ON PLASTICS

BACKGROUND OF THE INVENTION

Conventional plating of plastics, as pointed out in U.S. Pat. No. 3,556,955, conditions the plastic in a strong oxidizing solution, e.g. aqueous sulfuric acid-chromic acid. The plastic is next sensitized in a solution of a reducing agent such as stannous chloride and then activated by immersion in a noble metal salt solution before passing the plastic to an electroless plating bath.

This general method with the prior art polymers suffers from numerous disadvantages among which are the complexities of the process and the hazards and disposal problems with the chromic acid bath as well as lesser physical properties of the plated polymers. Various methods of overcoming some of these problems are proposed in U.S. Pat. Nos. 3,556,955 and 3,701,675. Polymers with acid groups or treated to have acid groups are neutralized with ammonia, alkali solutions or ethylenimine according to U.S. Pat. Nos. 3,567,488; 3,567,489 and 3,607,350. The polymers are then treated with a noble metal salt solution before being plated. U.S. Pat. No. 3,222,218 is similar to Czech Pat. No. 100,373 in that ion exchange groups on a polymer are treated with a noble metal salt and after ion exchange are reduced and then plated. Because plastic materials are non-conductive and inert to metals, adhesion of the metal plate to the plastic is a basic problem in the metallization of plastics.

SUMMARY OF THE INVENTION

The process of this invention provides improvement in adhesion between the plastic and the metallic layer deposited thereon, simplification in processing, elimination of chromic acid oxidizing baths, and improvements in thermal resistance and other physical properties of the plated article.

First, the invention depends on using certain thermoplastic polymers. In particular, the thermoplastic must contain a rubber modifier component in amounts of about 12 to 40 weight percent. It must also contain about 12 to 30 weight percent of an unsaturated acid or anhydride thereof and the balance to make 100 percent of one or more monomers copolymerized therewith. The thermoplastic is the product of polymerizing the monomers in the presence of the rubber in a finely divided form.

Secondly, the process comprises the step of aminating the surface to be metallized with a solution of ethylenediamine or 1,3-diaminopropane in an inert solvent which is not a solvent for the thermoplastic polymer. The solvent comprises about 50 to 100 volume percent of a water miscible organic solvent and 0 to about 50 volume percent of water. The aminated surface is then treated with a noble metal salt solution such as silver and thereafter with a reducing agent to produce a metallized surface having a resistance of about 100 ohms/sq. or less.

DESCRIPTION OF THE INVENTION

Notwithstanding the art in the field of metallization of plastics, the most commonly accepted plastic material for this use is a polymer of acrylonitrile/butadiene/styrene (commonly called ABS) and the process employed utilizes a chromic acid oxidizing bath and the subsequent steps previously noted. In fact, not all ABS polymers are generally suitable. Consequently, there is a limited choice of suitable plastic materials from a commercial standpoint.

By this invention, another group of plastic materials may now be utilized and may be metallized by a different, simpler process than the old chromic acid process. In addition to providing good adhesion, the plastics of this invention provide higher heat distortion and other improvements in physical properties.

The results of this invention are considered unique and unexpected since similar results are not obtained if the rubber component is omitted and if other aminating agents are used in place of ethylenediamine or 1,3-diaminopropane.

Essential to the invention is the use of a rubber modified thermoplastic polymer prepared by polymerizing an unsaturated carboxylic acid or anhydride with one or more copolymerizable monomers in the presence of the rubber in finely divided form. The benefits of this invention are not obtained if the rubber is omitted or if the rubber is merely blended or milled with a polymer prepared from the above monomers.

Adhesion is somehow related to the presence of the rubber component although no adequate explanation is presently known for this feature of the invention. In any event, tests demonstrate that the rubber is necessary. For best results, the rubber should be as finely divided as possible since adhesion decreases with coarse rubber particles. By finely divided rubber it is meant rubber particles having an average particle diameter in the range of about 0.1 to $1\mu$ with a maximum particle size of about $5\mu$. Average particle diameters of $5-30\mu$ and higher are considered coarse and unsuitable.

While the presence of the rubber is important, any of a variety of rubbers (elastomers) may be used such as natural rubber; rubbery copolymers of ethylene and propylene; conjugated diene rubbers such as polyisobutylene, polyisoprene and polybutadiene; copolymers of conjugate dienes and alkenyl aromatic monomers such as butadiene-styrene copolymers; nitrile rubbers such as a copolymer of butadiene and acrylonitrile; and the like. Preferred rubbers are the butadiene-styrene copolymers especially the block copolymers. It is known to employ small amounts of other monomers such as acrylonitrile in preparing preferred rubbers.

Unsaturated carboxylic monomers include acrylic acid, methacrylic acid, ethacrylic acid, 3-butenoic acid, 4-pentenoic acid and the like as well as di and polycarboxylic acid monomers such as maleic acid, itaconic acid, fumaric acid, citraconic acid aconitic acid and the like. The anhydrides of said di- and polycarboxylic acids are preferred in this invention. Especially preferred is maleic anhydride.

Copolymerizable monomers may be selected from a wide variety of known monomers including the alkyl acrylates and methacrylates, alkenyl aromatics, vinyl ether and ester monomers, etc. Typical of such monomers are methyl ethyl and butyl acrylate and methacrylate; styrene, vinyl toluene, t-butyl styrene; vinyl methyl ether, vinyl acetate, etc. Preferred are the alkenyl aromatic monomers and styrene is especially preferred.

The rubber modified unsaturated carboxylic acid or anhydride containing thermoplastic polymer comprises from about 12 to 40 weight percent rubber, preferably about 16 to 22 percent; about 12 to 30 weight percent of said acid or anhydride, preferably about 12 to 25 weight percent; and the balance to make 100 percent of one or more copolymerizable monomers. More preferably the acid or anhydride monomer comprises about 14 to 20 percent of the thermoplastic polymer. A certain minimum acid or anhydride content is necessary to obtain uniform metallization whereas at contents above the maximum solubilization of the polymer is a problem.

The process of this invention comprises the step of first aminating the surface to be metallized by contacting it with a solution of ethylenediamine or 1,3-diaminopropane in an inert solvent which is not a solvent for the thermoplastic polymer. Following amination, the surface is treated with a noble metal salt solution. Examples of noble metal salts that may be used are silver nitrate, platinic chloride, auric chloride, palladium chloride, as well as complex metal salts such as diamminesilver (I) nitrate. Finally, the surface is contacted with a reducing agent to produce a metallized surface having a resistance of 100 ohms/sq. or less, preferably 50 ohms/sq. or less. Resistance of this magnitude is needed in order to deposit subsequent metal layers by conventional plating processes. Typical reducing agents include formaldehyde, hydrazine, hydroxylamine, sodium borohydride, tartrates, hydroquinone and the like. Amination of the surface forms salts of the acid groups and halfamide and/or halfamide salts of the anhydride group.

It is to be understood that the surface to be metallized is usually rinsed after each of the process steps and that each step require only a few minutes. The time of contact can be extended but usually the necessary effect from each step occurs very rapidly and long contact times are neither necessary or desirable.

The inert solvent employed in the amination step comprises about 50 to 100 volume percent of a water miscible organic solvent and from 0 to about 50 percent of water. By inert it is meant that the solvent has no adverse reactive effect on the diamines dissolved therein or on the thermoplastic polymer, i.e., it is not a solvent for the polymer or has no adverse effect with its functional groups under the conditions employed.

A variety of useful organic solvents are available including such solvents as dioxane, acetonitrile, dimethyl formamide and alcohols. The alcohols are preferred as are the equal volume mixtures of alcohols with water. The more preferred alcohols are methyl, ethyl and isopropyl alcohol. Some of the above named organic solvents, such as the alcohols, may be used as the sole solvent whereas others are useful only as mixtures with water.

Aqueous solutions of the diamines utilized herein are not effective in producing the metal adhesion required and are therefor to be contrasted to agents such as aqueous hydrazine and hydroxylamine which recently have been found to be quite effective. Conversely, hydrazine and hydroxylamine are not effective as solutions in the solvent of this invention. No satisfactory explanation is yet available to explain these unexpected results but experimental evidence confirms them. This invention is even more unique in view of the generally poor results obtained with other amines as has been mentioned above and as will be shown later.

The following nonlimiting examples will further illustrate the invention.

EXAMPLE 1

A rubber modified styrene-maleic anhydride thermoplastic was prepared by polymerizing styrene and maleic anhydride in the presence of a finely divided styrene-butadiene (30:70) block copolymer rubber (average particle size in the range of 0.5 to $1\mu$ with a maximum particle size of about $2\mu$). The polymer contained about 19% rubber, 16% maleic anhydride and the balance styrene. The polymerization was effected in a ketone solvent at 85°–135°C using lauroyl peroxide as a catalyst.

An injection molded part of the above polymer was immersed in a 3M solution of ethylenediamine in a 1:1 (by volume) mixture of water and methyl alcohol for 10 minutes. Thereafter it was rinsed and then placed in a 0.3N $Ag(NH_3)_2NO_3$ bath for 5 minutes. After rinsing, the part was immersed in a reducing agent solution of 5% hydrazine in water. The metallized surface produced had a resistance of 19 ohms/sq. and had excellent metallization.

Following the above procedure replacing ethylenediamine with 1,2-diaminopropane a metallized surface having resistance of 14–32 ohms/sq. was obtained. The part was well metallized as above.

EXAMPLE 2

Following the procedure of example 1, the following tests were made with ethylenediamine with the results below.

| Surface* Resistivity, ohms/sq. | Peel Strength lbs/in. | |
|---|---|---|
| | Ave. | Max. |
| 16 | 3.0 | 3.2 |
| 15 | 2.5 | 3.0 |
| 11 | 2.7 | 3.0 |
| 8 | 2.3 | 2.6 |
| 6 | 3.2 | 3.3 |
| Average of tests | 2.7 | 3.0 |

*Resistance of metallized part before electroplating.

The above test was repeated using a polymer similar to example 1 except that the rubber content was about 28%. The average particle size of the rubber was about 0.1 to $0.4\mu$ with a maximum particle size of about $1\mu$. The part had a surface resistivity of 12 ohms/sq. before plating and the plated part had an average peel strength of 2.5 lbs/in. and a maximum of 2.8 lbs/in.

In the above and subsequent tests the metallized part was electroplated with about 0.002 in. of copper metal (from a copper pyrophosphate bath at 30–35 amps per sq. ft.). The peel strength was measured on an Instron Tester after the part had dried and aged for 24 hours or more. A 1 inch wide strip of metal plate was peeled off the sample at a 90° angle to the surface at a rate of 1 inch/min.

EXAMPLE 3

The time sequence of example 2 was changed in the following test to 5 minutes of immersion in the ethylenediamine solution, 5 minutes immersion in 0.3N Ag $NO_3$ in 10% ammonia solution and 1 minute reduction in 5% hydrazine solution.

| Surface Resistivity, ohms/sq. | Peel Strength lbs/in. | |
|---|---|---|
| | Ave. | Max. |
| 19 | 3.0 | 3.6 |
| 13 | 2.9 | 3.0 |
| 17 | 2.9 | 3.4 |
| 14 | 2.8 | 3.2 |
| 12 | 2.6 | 3.3 |
| 14 | 3.2 | 3.7 |
| Average of tests | 2.9 | 3.4 |

The above tests were repeated with the polymer containing about 28% rubber.

| Surface Resistivity, ohms/sq. | Peel Strength lbs/in. | |
|---|---|---|
| | Ave. | Max. |
| 8 | 2.3 | 2.6 |
| 10 | 2.2 | 2.6 |
| 7 | 2.9 | 3.6 |
| 11 | 2.9 | 3.2 |
| 7 | 5.3 | 5.6 |
| 7 | 2.9 | 3.4 |
| Average of tests | 3.1 | 3.5 |

These latter tests were repeated changing the initial immersion time from 5 to 10 minutes. The part has a resistivity of 10 ohms/sq. and an average peel strength of 3.1 lbs/in. with a maximum of 3.5 lbs/in.

EXAMPLE 4

In contrast to the above results, a number of other amines were tested in a similar manner and the results reported below. While metallization to some degree occurred in some cases, it was insufficient for subsequent plating purposes.

| Amine Reagent | Surface Resistivity (ohms/sq.) Results |
|---|---|
| N,N-dimethyl hydrazine | no metallization |
| methyl hydrazine | v. sl. metallization |
| hydroxyethyl hydrazine | no metallization |
| methyl hydrazine* | >$10^2$; dull black, silver surface |
| triethylene tetraamine | no metallization |
| diethylenetriamine | >$10^5$; v. sl. metallization |
| pyridine | no metallization |
| morpholine | no metallization |
| hydroxyethylamine | 82–210; light metallization |

*noble metal was 0.3N $AgNO_3$ in 10% ammonia

Hydrazine was also tested by the above procedure except that the first step immersion was for four minutes and upon immersion in 0.3N Ag $(NH_3)_2NO_3$ reduction occurred immediately to form a gray-black deposit. Repeat tests were made using a shorter immersion time of one and two minutes but insufficient metallization occurred.

EXAMPLE 5

The above tests were repeated using an aqueous solution of ethylenediamine but the results were erratic. While a silver metal deposit was obtained in one case having a resistance of 43–150 ohms/sq., subsequent electroplating resulted in bare spots and inhomogeneous plating.

EXAMPLE 6

The proportions of water to methanol were evaluated in another series of tests using 3M ethylenediamine and the above procedure with the results recorded below.

| Volume Ratio $CH_3OH$/Water | Surface Resistivity ohms/sq. |
|---|---|
| 20/80 | >$10^5$ >$10^6$ |
| 40/60 | 40, 13, >$10^5$ |
| 50/50 | 13, 9 |
| 60/40 | 9, 13, 8, 15 |
| 80/20 | 9, 18, 9, 13 |
| 100/0 | 8, 18, 9, 14 |

Except for the first test, the parts were electroplated. All parts plated well except for those prepared with the 40/60 solvent ratio. It can be seen therefore that consistent results are obtained with an alcohol to water ratio of 50/50 and higher and with methyl alcohol as the sole solvent.

EXAMPLE 7

Organic solvents other than methyl alcohol were tested by the above procedure using 3M ethylenediamine dissolved in a 1:1 v/v solvent of water and the organic solvent. The parts were tested for adhesion as before. The results are recorded below.

| Organic Solvent* | Surface Resistivity ohms/sq. | Peel Strength lbs/in. |
|---|---|---|
| dioxane | 10, 18 | 1.3, 2.0 |
| dimethylformamide | 16, 17 | 2.5, 2.0 |
| acetonitrile | 13, 9 | 1.5, 1.5 |
| ethyl alcohol | 22, 14 | 2.2, 2.9 |
| isopropyl alcohol | 9, 20 | 2.3, 2.9 |
| methyl alcohol | 9, 15 | 2.5, 3.1 |

*1:1 v/v mixture with water

An attempt was made to use tetrahydrofuran as the organic solvent but it dissolved the polymer. Based on the previous results, it can be seen that best results are obtained with the alcohols.

What is claimed is:

1. A process for metallizing plastic articles formed from a rubber modified unsaturated carboxylic acid or anhydride containing thermoplastic polymer which comprises the steps of
   a. aminating the surface to be metallized by contacting it with a solution of ethylenediamine or 1,3-diaminopropane in an inert solvent comprising from about 50 to 100 volume percent of a water miscible organic solvent and from 0 to about 50 percent water,
   b. contacting the aminated surface with a noble metal salt solution and
   c. treating said surface with a reducing agent forming a metallized surface having a resistance of about 100 ohms/sq. or less;
   wherein said rubber modified polymer contains about 12 to 40 weight percent rubber, about 12 to 30 weight percent of said acid or anhydride and the balance to make 100 percent of one or more monomers copolymerized therewith and wherein said polymer is the product of polymerizing the monomers in the presence of the rubber in a finely divided form.

2. The process of claim 1 further comprising the step of depositing one or more metallic layers on the metallized surface.

3. The process of claim 1 wherein the noble metal is silver.

4. The process of claim 1 wherein the rubber content is about 16 to 22 percent.

5. The process of claim 1 wherein the acid or anhydride content is about 12 to 25 percent.

6. The process of claim 1 wherein the acid or anhydride content is about 14 to 20 percent.

7. The process of claim 1 wherein said polymer is a rubber modified polymer of an unsaturated dicarboxylic acid anhydride and a copolymerizable monomer.

8. The process of claim 1 wherein said polymer is a rubber modified styrene-maleic anhydride copolymer.

9. The process of claim 1 wherein said organic solvent is an alcohol.

10. The process of claim 9 wherein said solvent is a 50:50, water:alcohol mixture.

11. The process of claim 10 wherein said alcohol is methyl alcohol, ethyl alcohol or isopropyl alcohol.

12. A process for metallizing plastic articles formed from a rubber modified unsaturated dicarboxylic acid anhydride containing thermoplastic polymer which comprises the steps of
  a. aminating the surface to be metallized by contacting it with a solution of ethylenediamine or 1,3-diaminopropane in an inert solvent comprising from about 50 to 100 volume percent of a water miscible organic solvent and from 0 to about 50 percent water,
  b. contacting the aminated surface with a noble metal salt solution and
  c. treating said surface with a reducing agent forming a metallized surface having a resistance of about 100 ohms/sq. or less;
wherein said rubber modified polymer contains about 12 to 40 weight percent rubber, about 12 to 30 weight percent of said anhydride and the balance to make 100 percent of one or more monomers copolymerizable therewith and wherein said polymer is the product of polymerizing the monomers in the presence of the rubber in a finely divided form.

13. The process of claim 12 further comprising the step of depositing one or more metallic layers on the metallized surface.

14. The process of claim 12 wherein the polymer is a rubber modified polymer of said anhydride and an alkenyl aromatic monomer.

15. The process of claim 14 wherein said polymer is a rubber modified styrene-maleic anhydride polymer.

16. The process of claim 14 wherein said rubber is a styrene-butadiene rubber.

17. The process of claim 14 wherein the rubber comprises about 16 to 22 percent and the anhydride about 14 to 20 percent.

18. The process of claim 12 wherein said organic solvent is an alcohol.

19. The process of claim 18 wherein said solvent is a 50:50, water:alcohol mixture.

20. The process of claim 19 wherein said alcohol is methyl alcohol, ethyl alcohol or isopropyl alcohol.

21. The process of claim 12 wherein the noble metal is silver.

* * * * *